United States Patent [19]

Cougoul et al.

[11] 4,120,920

[45] Oct. 17, 1978

[54] PROCESS FOR EXTRUSION OF PYROTECHNICAL COMPOSITIONS

[75] Inventors: Pierre Cougoul; Marc Saunier, both of Saint Medard en Jalles; Jean Lucien Tranchant, Vert le Petit, all of France

[73] Assignee: Societe Nationale des Poudres et Explosifs, France

[21] Appl. No.: 725,044

[22] Filed: Sep. 20, 1976

[30] Foreign Application Priority Data

Sep. 25, 1975 [FR] France .................. 75 29338

[51] Int. Cl.² ............................................. C06B 21/00
[52] U.S. Cl. ..................... 264/3 R; 149/96; 264/3 B
[58] Field of Search .................. 264/3 R, 3 B; 149/96

[56] References Cited

U.S. PATENT DOCUMENTS

| 2,926,386 | 3/1960 | Hutchinson | 264/3 R |
| 3,155,749 | 11/1964 | Rossen et al. | 264/3 B |
| 3,296,043 | 1/1967 | Fluke et al. | 264/3 R |
| 3,928,514 | 12/1975 | Brachert et al. | 264/3 R |

FOREIGN PATENT DOCUMENTS 630,387 12/1961 Italy .......................... 264/3 B

*Primary Examiner*—Edward A. Miller
*Attorney, Agent, or Firm*—Bucknam and Archer

[57] ABSTRACT

Screw extruder and process utilizing same for the production of extrusions formed of compositions based on plasticized nitrocellulose. Process comprises at least one sequence of the following main operations carried out in corresponding zones in the extruder: (i) mixing and shearing the constituents of the composition to effect gelatinization thereof; (ii) retarding the forward movement of the composition by throttling; and (iii) drying the gelatinized composition by evaporation under a reduced pressure prior to extrusion of the composition from the outlet die of the extruder.

9 Claims, 3 Drawing Figures

PROCESS FOR EXTRUSION OF PYROTECHNICAL COMPOSITIONS

The present invention is concerned with a process for the production of extrusions formed of compositions based on plasticized nitrocellulose and, more particularly, with a method for the continuous production of propellant extrusions based on nitrocellulose gelled with an explosive oil and with a screw-extruder for carrying out such a method.

Propellants based on nitrocellulose gelled with an explosive oil, particularly propellants produced without using a solvent, known as "SD" propellants, are usually made by mixing the constituents of the composition in a blade mixer. For reasons of safety, the kneading of the constituents is carried out with a high moisture content, usually around 25%, and agglomeration of the composition is carried out by progressively reducing the moisture content by heating and compression. The agglomeration of the composition results from the gelling of the nitrocellulose by an explosive oil, such as nitroglycerine, SD propellant compositions generally comprising from 50 to 70% of nitrocellulose and from 30 to 50% of nitroglycerine, additives such as plasticizers, stabilizers and combustion-modifiers being incorporated in proportions of from 5 to 10% of the total weight of the nitrocellulose and nitroglycerine. Agglomeration by heating and compression, which is accompanied by progressive reduction in the moisture content, is carried out in conventional processing by successive passes through heated rolling mills. Homogenization of the composition, its gelling and drying result from intense kneading and shearing between the rolls of the rolling mill. This conventional method, although very effective, is not satisfactory since it requires manual interventions and consequent exposure of operatives to the risk of explosion. Because of the precautions which it is necessary to take, the manufacturing time and, in particular, the man-hours required, are substantial and the process is essentially discontinuous.

The disadvantages of this conventional method, which is still the method most widely employed for the manufacture of SD propellants, have directed research towards finding a better process and for some twenty years, various methods have been proposed and used which involve the use of screw-mixers and screw-extruders. The use of mixers and extruders not only enables drying, homogenization and mixing of the composition to be carried out continuously, but enables the process to be automated and remote controlled at a relatively low cost. Consequently their operation is much less dangerous, more particularly as in a continuous method, the installation contains less of the dangerous material than in a discontinuous method and the man-hours required is also considerably reduced. However, these machines do not enable all the operations which lie between the initial mixing of the constituents of the composition and the extrusion of the propellant to be carried out because currently available screw-mixers and screw-extruders do not enable the moisture content of the composition to be reduced to below 4%, which is much too high for the majority of pyrotechnical compositions, and especially for SD propellants, since it is essential that the latter should have a moisture content of less than 1%, and if possible of about 0.3%. German Patent D 1048212 refers to such a method for manufacture of propellants and explosives and illustrates very well the need for drying of the composition in a suction shaft before the final extrusion of the propellant. In the drying step, it is necessary to extrude chips or strips of the propellant so that moisture can more easily be extracted from them.

We have now found that all the operations necessary for compaction, gelling, drying and extrusion of pyrotechnical compositions can be carried out in a single screw-extruder and that extrusions having a moisture content as low as 0.3% can be obtained.

According to one aspect of the present invention, we provide a process for the production of extrusions formed of compositions based on plasticized nitrocellulose, which comprises passing the constituents of the composition through a screw-extruder which is adapted to carry out at least one sequence of the following main operations: (i) mixing and shearing the constituents of the composition to effect gelatinization thereof; (ii) retarding the forward movement of the composition by means of a throttling zone in the extruder; and (iii) drying the gelatinised composition by evaporation under reduced pressure, prior to extrusion of the composition from the outlet die of the extruder.

In a preferred form of the process, the screw-extruder is adapted to carry out the following sequence of preliminary operations before the or the first of the sequence(s) of main operations; (a) compacting the constituents of the composition; (b) retarding the forward movement of the composition by means of a throttling zone in the extruder; and (c) drying the compacted composition by draining off water therefrom.

Furthermore, the screw-extruder is preferably adapted to progressively pressurize the composition after the or the last of the sequence(s) of main operations and prior to said extrusion of the composition from the outlet die of the extruder.

The process is preferably carried out by means of an extruder comprising at least two screws having parallel axes. For carrying out the first of the main operations each of these screws includes a group or assembly of eccentric discs offset angularly about the screw for enabling effective mixing of the composition. Because of the eccentricity of adjacent discs, the tangential velocities of the periphery of these discs are different, thus enabling shear stresses to be induced in the composition, these stresses causing in the heart of the composition a relative slip which enables good homogenization to be obtained. The second of the main operations improves the efficiency of the first operation, since the retardation of the composition, which is obtained by this second operation, considerably increases the mixing time, which is in addition carried out at a high pressure because of the retardation. Preferably, throttling of the flow of the composition is produced by a helical screw element which has a reverse pitch, tending to oppose the forward, or downstream, movement of the composition. The screw thread of this element may be only partial in order not to increase the resistance to flow of the composition too much, especially when the screw thread extends more than one-and-a-half times around the extruder screw. The throttling zone may equally well be formed by a series of discs concentric with the extruder screws, of a diameter slightly less than the diameter of a bore in which the screws are housed, the discs on each of the screws being offset axially so that they overlap the discs on the other screw.

Preferably, two sequences of the main operations are carried out, especially when the initial composition comprises more than 25% by weight of evaporable liquid and the extruded composition must contain less than 0.8% by weight of evaporable liquid, or when sufficient raising of the temperature is not possible.

Drying of the composition by evaporation under reduced pressure is preferably carried out at a pressure of less than 200 mmHg and when two sequences of the main operations are carried out the second evaporation is more preferably carried out at a pressure of less than 60 mmHg.

The screws of the extruder, there preferably being two screws, preferably rotate in the same direction.

When the process is used for the continuous production of propellant extrusions based on nitrocellulose gelled with an explosive oil, nitroglycerine being preferred, the preliminary operations are preferably carried out at around ambient temperature, whereas the main operations and the progressive pressurizing of the composition thereafter should be carried out at a temperature above 80° C.

In the preferred process at least one sequence of the main operations includes a fourth operation which comprises the recompression of the composition which has previously been expanded during the drying operation. The addition of this fourth operation is particularly desirable when the process includes at least two sequences of the main operations. It enables the efficacy of the first operation of the second sequence of main operations to be increased, the composition being kept more effectively in the zone where this first operation takes place.

It is advisable, where there is a risk that the composition might catch fire, to centre the screws with respect to the housing by feeding into the screw extruder, prior to the initial addition, and after the final addition, of the constituents of the composition, a material such as one based on non-nitrated cellulose fibres containing pyrotechnically inert additives and which has a resistance to forward motion in the extruder which is of the same order of that of pyrotechnical composition being processed.

According to a further aspect of the present invention we provide a screw extruder for producing extrusions formed of compositions based on plasticised nitrocellulose, comprising at least one sequence of the following main zones: (i) a zone for mixing and shearing the constituents of the composition for effecting gelatinization thereof; (ii) downstream thereof, a throttling zone for retarding the forward movement of the composition; and (iii) downstream thereof, a drying zone connectable to a pump for effecting drying of the gelatinised composition by evaporation under reduced pressure prior to extrusion from the extruder.

Preferably the screw extruder has at least two screws, each of which has: an assembly of eccentric discs offset angularly about the screw in the or each mixing and shearing zone for effecting said mixing and shearing of the constituents; a helically extending formation having a reverse pitch in the or each throttling zone for effecting retardation of the forward movement of the composition; and a helically extending formation in the or each drying zone for forwarding and expanding the composition therein.

The screw extruder may also comprise the following preliminary zones before the or the first sequence of main zones: (a) a compacting zone for compacting the constituents of the composition; (b) downstream thereof, a throttling zone for retarding the forward movement of the composition; and (c) downstream thereof, a zone provided with drain means for enabling the compacted composition to be dried by draining water therefrom through said drain means.

In such a screw extruder each screw may have: an assembly of eccentric discs offset angularly about the screw in said compacting zone for compacting said constituents; a helically extending formation having a reverse pitch in said preliminary throttling zone for retarding the forward movement of the composition; and a helically extending formation for forwarding and expanding the material in said zone provided with the drain means.

Preferably the screw extruder includes two sequences of the main zones. Furthermore, it is preferred that the assembly of eccentric discs in the or each mixing and shearing zone comprises at least five discs the generatrices of which furthest from the axis of rotation of the screw are arranged helically in order to form one turn of a helix in the direction of flow of the composition since this causes a more effective retention of the composition in this zone whilst providing a sufficient flow therethrough. Also, the assembly of eccentric discs in the compacting zone preferably comprises at least three discs the generatrices of which furthest from the axis of rotation of the screw are likewise arranged helically in order to form one turn of a helix in the direction of flow of the composition.

In a particularly simple and effective arrangement, the screw extruder comprises two screws which are capable of being mounted for rotation in the same direction, and all the helical elements on the screws have substantially the same outer diameter, the two bores in the housing containing the two screws having cylindrical bores over their whole length.

When the extruder is intended to be used for the extrusion of pyrotechnical compositions which are in general sensitive to any excess temperature, it is desirable to have particularly effective thermal regulation, and as the screws present an area of contact to the pyrotechnical composition which is substantially three times the area of contact between the housing and the composition, it is particularly advantageous to employ the screws for the thermal regulation. In addition, as the extrusion of the composition at the downstream end of the extruder is carried out at high pressure, generally above 100 bars, it is desirable to have particularly effective thermal regulation of the downstream end of the screw. For this purpose, each screw of the extruder forming the preferred embodiment includes two thermal regulation circuits, a first peripheral circuit for ensuring the thermal regulation of the preliminary zones and the main zones, and a second circuit in the vicinity of the axis of the screws for ensuring the thermal regulation in zones downstream of the main zones.

In a preferred arrangement, at least one sequence of the main zones includes a fourth zone capable of recompressing the composition.

In order that the present invention may be more fully understood, a preferred embodiment, which is given by way of example only, will now be described in more detail with reference to the accompanying drawings, in which.

Figure 1:
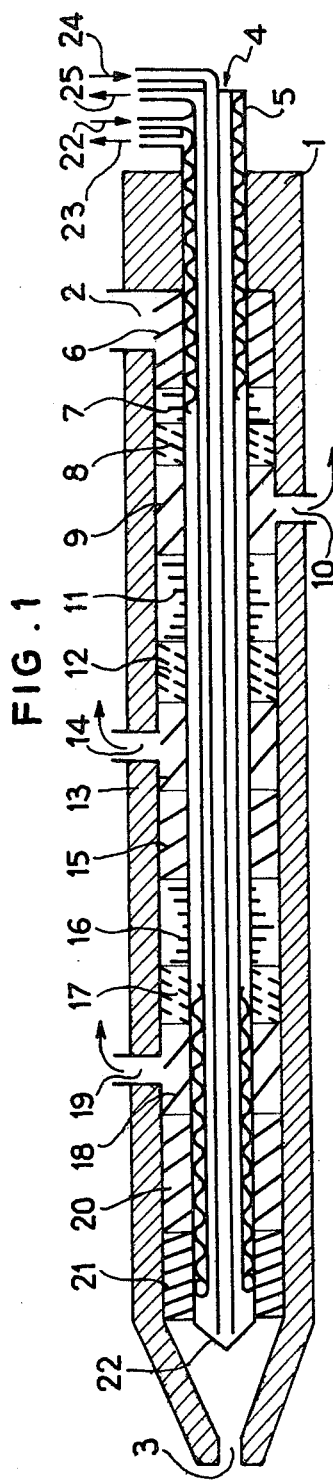
FIG. 1 shows schematically the construction of an extruder along a longitudinal section passing through the axis of one screw.

In FIG. 1 there is shown a screw extruder which comprises a housing 1 having therein an inlet 2 and an outlet 3. Around the outlet 3 is fitted an extrusion head capable through the use of different sized outlet dies of varying the cross-sectional area of an extrusion. Within the housing 1 are mounted two screws 4 (only one of which can be seen). These screws 4 are identical and so arranged that they do not come into mutual contact or into contact with the housing 1 during operation of the screw extruder. Each screw 4 has a central core 5 through which run thermal regulation circuits. These circuits comprise a flat peripheral circuit, having an inlet 22 and an outlet 23 through which water at 80° C. circulates helically during operation of the extruder, and a second concentric axial circuit having an inlet 24 and an outlet 25 through which water at 60° C. circulates. Keyed on to each screw are the following elements:

in a conveying zone of the extruder, a helically extending formation formed by a helical element 6 of varied coarse pitch which ensures the downstream conveyance of the constituents of the composition which have previously been fed in predetermined proportions into a conventional blade mixer (not shown) and which have been introduced into the housing by a constant-flow feed device (not shown) through the inlet 2 (this feed device (not shown) comprises two reservoirs, one containing the constituents of the desired extrusion and the other containing an inert mixture based on non-nitrated nitrocellulose fibres which are used at the time of starting up the extruder and at the time of stopping it);

in a compacting zone, an assembly of three eccentric discs 7 having the same diameter, offset around the screw by 120° to form a helix in the direction of flow of the composition, which ensures compaction of the constituents, especially pieces of nitrocellulose which have already been compressed by the helical element 6 (the mixing obtained by the discs initiates gelling of the nitrocellulose and lowers the viscosity of the composition);

in a throttling zone, a helically extending formation formed by an element 8 having a reverse pitch shorter than the pitch of the helical element 6, the element 8 being interrupted along its helical extent to form crenellations enabling the composition to flow whilst ensuring, on the one hand, a retardation or throttling of this flow in order to cause a retention of the composition in the compacting and mixing zone of the assembly of discs 7, and on the other hand, a stirring of the composition and a distribution of the composition which gets past this retention element;

in a draining zone, a helically extending formation formed by a helical element 9 of very coarse pitch which enables the compacted and gelled composition to be carried along and expanded, the water from the composition being removed by draining through a drain aperture 10.

After the conveying zone and the compacting, throttling and draining zones (which latter three zones comprise the preliminary zones), the main zones of the extruder are provided, each screw being provided with the following elements:

in a mixing and shearing zone, an assembly of five eccentric discs 11 of the same diameter, offset angularly around the screw to form a helix in the direction of flow of the composition (the discs 11 enable gelling of the nitrocellulose by mixing and shearing under pressure of the composition which has been compacted and dried in the preliminary compacting and drying zones);

in a throttling zone, a helically extending formation formed by an element 12 having a reverse pitch, which is of the same general form as the helical element 8 and which performs substantially the same functions;

in a drying zone, a helically extending formation formed by a helical element 13 of very coarse pitch for forwarding and expanding the gelled composition which is put under reduced pressure by connection on an aperture 14 formed in the top portion of the housing of the extruder in this zone to a high-flow suction pump which maintains a pressure around 90 mmHg and exhausts water vapour evaporated from the composition;

in a recompression zone, a helically extending formation formed by a helical element 15 of average pitch which enables recompression of the composition after its passage through the drying zone;

in a second mixing and shearing zone, an assembly of eight eccentric discs 16 of the same diameter, offset angularly about the screw to form a helix in the direction of flow of the composition (these discs ensure efficient gelling of the nitrocellulose and homogenization of the composition);

in a second throttling zone, a helically extending element 17 having a reverse pitch, and of substantially the same form as the elements 8 and 12 and having substantially the same functions (the pressure of the composition in the mixing and shearing zone resulting on the one hand from the element 17 located downstream thereof and on the other hand from the helical element 15 located upstream thereof);

in a second drying zone a helical element 18 of very coarse itch, which is substantially the same as the element 13 and which ensures the same functions (the aperture 19 formed in the top portion of the housing in this zone being connected to a suction pump enabling evaporation to take place under a reduced pressure of substantially 20 mmHg); and in a second recompression zone, a helical element 20 of average pitch which is substantially the same as the element 15 and which enables light recompression of the composition after its passage through the second drying zone.

Thus, it will be seen that the extruder is provided with two sequences of four main zones.

The main zones are followed by further zones, in which each screw is provided with the following elements;

in a progressive pressurizing zone, a helical element 21 of fine pitch adapted to progressively pressurize the composition, (a high pressure being necessary to the extrusion of the composition); and in a transition zone, a substantially conical transition element 22 which is engaged in a converging portion of the housing 1 of the extruder.

Figure 2:
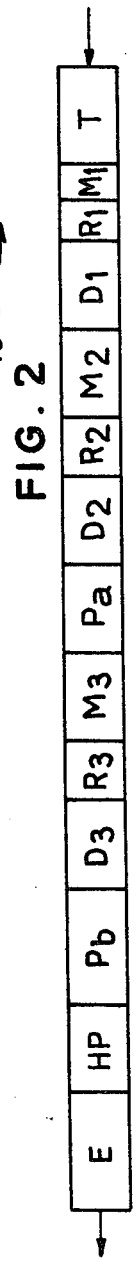
FIG. 2 is an operational diagram of the various operations carried out in the extruder.

The various sequence of operations which take place during the course of the process of extrusion are shown in FIG. 2 in which the letters correspond with the following operations as follows:

T : conveyance of the constituents;
$M_1$ : compacting the mixing of the constituents;
$R_1$ : first retardation by arranging a throttling zone;
$D_1$ : first expansion, enabling drying by draining;
$M_2$ : mixing and shearing, under pressure to effect gelatinization;

$R_2$ : retardation in a throttling zone;

$D_2$ : second expansion, enabling drying by evaporation under a reduced pressure;

Pa : recompression between the two sequences of main operations $M_2$, $R_2$, $D_2$ and $M_3$, $R_3$, $D_3$;

$M_3$ : further mixing and shearing under pressure to effect gelatinization;

$R_3$ : further retardation in a throttling zone;

$D_3$ : third expansion, enabling drying by evaporation under a reduced pressure;

Pb : recompression between the last main operation $D_3$ and the following operation;

HP : progressively putting the composition under high pressure, and

E : extrusion transition.

The method and the corresponding extruder which have been described above have been tested for continuous manufacture of various pyrotechnical compositions, and the most conclusive results have been obtained for the manufacture of double-bass propellants without solvents (SD) or having a low solvent content. For example a SD propellant exhibiting the following composition:

Slab (66% nitrocellulose and 34 nitroglycerine); 90 parts

Centralite; 3 parts

Various additives; 10 parts has been obtained and displays the same qualities as a SD propellant manufactured by the conventional process employing rolling mills and extrusion presses.

The operations prior to the introduction of the constituents into the extruder were the same as the operations carried out before the successive rollings of the conventional method, these operations being:

drying of the pure slab in order to lower the moisture content which it is necessary to maintain for storage or transport of nitrocellulose impregnated with nitroglycerine; and mixing in a blade mixer with incorporation of the other constituents.

The moisture content of the constituents prior to being introduced into the extruder was 21% and the apparent specific gravity of these constituents was around 0.3. As the composition contains centralite it is indispensable to work at a real temperature higher than 72° centigrade which is the melting point of the centralite, but because of the viscosity of the plasticized composition it is necessary to work at a temperature higher than 80° C. from the zone where partial gelatinization of the nitrocellulose is effected, onwards. The thermal regulation circuits enable heating of the whole of the extruder prior to carrying out the extrusion process, heating of the elements in the preliminary zones which receive the constituents at ambient temperature and of the elements in the drying zones which are subjected to continuous evaporation, and cooling of the elements in the pressurized zones. The thermal regulation circuits of the two screws employ water and the first, peripheral circuit, which circulates water at 80° C., helically, effects heating, whilst the second, concentric axial circuit which employs water at 60° C., is intended to cool the elements 21 and 22 which undergo greater heating because of the rise in pressure.

Figure 3:
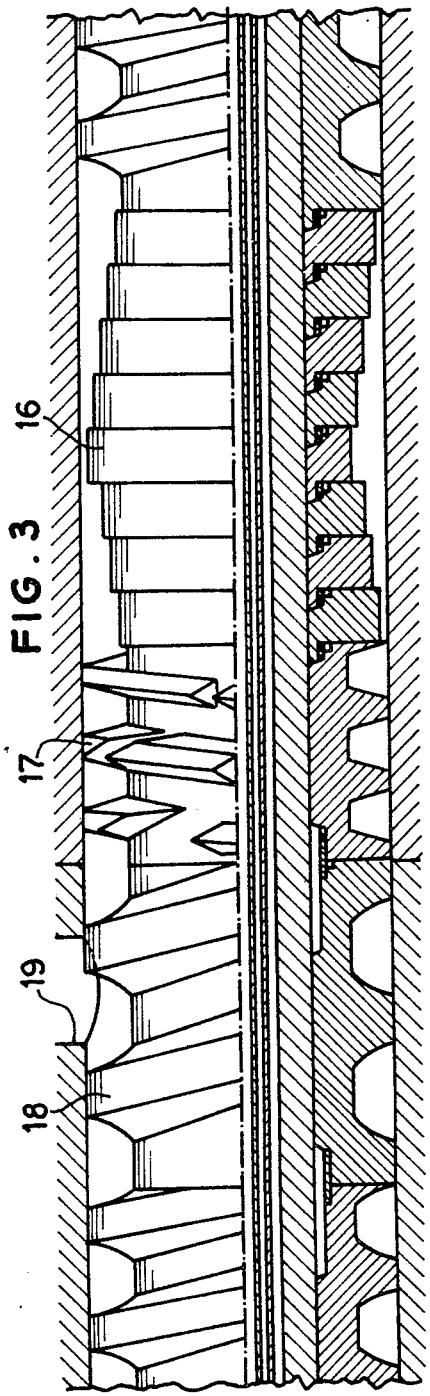
FIG. 3 is a partial longitudinal axial section showing a sequence of elements of the extruder.

FIG. 3 shows more clearly the second sequence of the main zones in the extruder of FIG. 1. The assembly 16 of eight eccentric discs forms a mixing zone of a length of 120 millimeters. The reverse pitch element 17 has a pitch of 20 millimeters and the helical expansion element 18 has a very coarse pitch of a value of 40 millimeters completing this sequence. The final helical element 21 (not shown in FIG. 3), which provides the extrusion pressure has a pitch of 15 millimeters. Such dimensioning of the extruder enables a propellant extrusion of a diameter of 30 millimeters to be obtained with an output of the order of some twenty kilograms per hour. This propellant, the composition of which has been given above, exhibits a residual moisture content of about 0.3% and the progressive lowering of the moisture throughout the process is substantially the following in the experimental device:

8 to 12% at the end of the operation $M_1$;

5 to 8% at the end of the operation $D_1$;

2 to 4% at the end of the operation $M_2$;

1 to 1.5% at the end of the operation $D_2$;

0.7 to 1% at the end of the operation $M_3$;

0.4 to 0.5% at the end of the operation $D_3$; and 0.3% at the output from the die of the extruder.

The pressure which prevails in the converging portion of the housing lies between 200 and 250 bars and the speed of rotation of the screws is of the order of 12 r.p.m. to obtain an output of 18 kilograms of propellant per hour.

The extruder is particularly suited to the continuous manufacture of propellants with a nitrocellulose base, since it enables all the manual stages, which demand very large and dangerous installations, to be eliminated by replacing them by a sequence of operations which take place wholly inside one screw extruder. The described embodiment represents an important technical progress to the manufacture on the one hand of other pyrotechnical compositions with a base of plasticized nitrocellulose such as flare compositions and on the other hand of nonpyrotechnical plastic compositions such as nitrocellulose plasticized by means of an inert plasticizer, for example, triacetin, employed in the proportion of 25% by weight. The embodiment may equally well be employed in the manufacture of any other extrudable composition which has to undergo very efficient malaxation and very complete elimination of the volatile products contained in this composition.

We claim:

1. A process for the production of propellants based on nitrocellulose, said nitrocellulose being gelatinized by an explosive oil, which comprises introducing the constituents of the propellant into a screw extruder and subjecting the mixture of the constituents in the extruder to the following steps (1) mixing and shearing the constituents of the composition to effect gelatinization thereof; (2) compacting; (3) retarding the forward movement of the composition; (4) drying the gelatinized composition by evaporation under reduced pressure; (5) progressively pressurizing prior to extrusion of the composition from the outlet die of the extruder, carrying out said sequence of steps: (1), (2), (3), (4) and (5) at least once.

2. A process according to claim 1, in which two sequences of the steps are carried out.

3. A process according to claim 1, in which said drying in said step (4) is carried out at a pressure below 200 mmHg.

4. A process according to claim 2, in which the second reduced pressure evaporation step is carried out at a pressure below 60 mmHg.

5. A process according to claim 1, in which the steps and the final extrusion of the composition are carried out at a temperature above 80° C.

6. A process according to claim 1, in which preliminary operations of (a) compacting the constituents of the composition; (b) retarding the forward movement of the composition by means of a throttling zone in said extruder; and (c) drying the compacted composition by draining off water therefrom; are carried out at substantially ambient temperature.

7. A process according to claim 1, in which said screw extruder comprises more than one screw and the screws are rotated in the same direction during operation.

8. A process according to claim 1, in which a pyrotechnically inert material is fed into the screw extruder prior to the initial addition, and after the final addition, of the constituents of the composition.

9. A process according to claim 8, in which the inert material is based on non-nitrated cellulose fibres.

* * * * *